United States Patent [19]
Andou et al.

[11] Patent Number: 5,712,640
[45] Date of Patent: Jan. 27, 1998

[54] RADAR MODULE FOR RADAR SYSTEM ON MOTOR VEHICLE

[75] Inventors: Hiroyuki Andou; Shigeki Katou, both of Saitama-ken, Japan

[73] Assignee: Honda Giken Kogyo Kabushiki Kaisha, Tokyo, Japan

[21] Appl. No.: 563,058

[22] Filed: Nov. 27, 1995

[30] Foreign Application Priority Data

Nov. 28, 1994 [JP] Japan ................... 6-317546

[51] Int. Cl.⁶ .................................................. G01S 13/93
[52] U.S. Cl. ........................................ 342/70; 342/72
[58] Field of Search ............................. 342/70, 71, 72

[56] References Cited

U.S. PATENT DOCUMENTS

| | | | |
|---|---|---|---|
| 4,319,244 | 3/1982 | Hirota et al. | 342/104 |
| 4,345,257 | 8/1982 | Brunner | 342/43 |
| 4,349,823 | 9/1982 | Tagami et al. | 340/815.24 X |
| 5,036,324 | 7/1991 | Lamper et al. | 342/132 |
| 5,392,051 | 2/1995 | Uematsu et al. | 342/165 |
| 5,394,154 | 2/1995 | Uematsu et al. | 342/165 |
| 5,400,032 | 3/1995 | Asbury et al. | 342/70 |
| 5,455,589 | 10/1995 | Huguenin et al. | 342/175 |
| 5,481,268 | 1/1996 | Higgins | 342/70 |
| 5,495,255 | 2/1996 | Komatsu et al. | 342/175 |
| 5,508,706 | 4/1996 | Tsou et al. | 342/192 |
| 5,512,901 | 4/1996 | Chen et al. | 342/175 |
| 5,583,495 | 12/1996 | Ben Lulu | 340/904 |
| 5,583,511 | 12/1996 | Hulderman | 342/175 |

FOREIGN PATENT DOCUMENTS

| | | |
|---|---|---|
| 58-036741 | 3/1983 | Japan . |
| 58-063871 | 4/1983 | Japan . |
| 59-038675 | 3/1984 | Japan . |
| 59-105586 | 6/1984 | Japan . |
| 60-024479 | 2/1985 | Japan . |
| 60-073382 | 4/1985 | Japan . |

*Primary Examiner*—John B. Sotomayor
*Attorney, Agent, or Firm*—Lyon & Lyon LLP

[57] ABSTRACT

A FM radar alarm system for use on a motor vehicle detects a following motor vehicle in an adjacent lane behind the motor vehicle. The FM radar alarm system includes an FM radar module including a near-region monitoring antenna and a far-region monitoring antenna. The near-region monitoring antenna radiates a relatively wide radio-wave beam in a near region positioned behind the motor vehicle and extending over an adjacent lane. The far-region monitoring antenna radiates a relatively narrow radio-wave beam in a far region positioned behind the motor vehicle and extending over the adjacent lane.

10 Claims, 4 Drawing Sheets

RADAR MODULE FOR RADAR SYSTEM ON MOTOR VEHICLE

BACKGROUND OF THE INVENTION

1. Field of the Invention

The present invention relates to a radar module for a radar system on a motor vehicle, and more particularly to a radar module for a radar alarm system which is preferably used on a motor vehicle to detect following motor vehicles to aid in preventing rear-end collisions when the motor vehicle changes lanes.

2. Description of the Prior Art

Radar systems on motor vehicles are used in combination with alarm devices and indicators for helping to prevent collisions on roads. Most radar systems which are being developed for use as such radar alarm systems on motor vehicles are roughly classified into laser-beam radar systems and radio-wave radar systems.

The laser-beam radar systems have problems in that the distance that the laser beam can be propagated will be reduced, resulting in an appreciable decrease in the detecting capability, under severe conditions such as in rain, snow, and fog that motor vehicles are frequently subject to when in use.

The radio-wave radar systems also suffer their own disadvantages of interference susceptibility and low bearing resolution, but are advantageous because their detecting capability will not be lowered to a large degree in rain and snow.

The radio-wave radar systems are required to detect objects in small ranges of about several tens of centimeters since they are used to warn against collisions with other motor vehicles at small vehicle-to-vehicle distances in a traffic jam or collisions with objects as when the motor vehicle is driven into the garage. Such requirements can be met better by FM and AM radar systems than by pulse radar systems. The FM radar systems are more suitable for use as motor vehicle radar alarm systems than the AM radar systems because of less susceptibility to interference between radar systems.

Radar alarm systems on motor vehicles usually have a maximum range of about 150 m. Therefore, FM radar systems as motor vehicle radar alarm systems should preferably use a high-frequency range of millimeter waves in order to minimize the size of radar modules, especially antennas, which are used. One such millimeter-wave FM radar system is disclosed in U.S. Pat. Nos. 4,349,823, 5,392,051, 5,394,154, for example, filed by the assignee of the present application.

It is important for the radar alarm systems on motor vehicles to monitor a front area in front of the motor vehicle and also a rear area behind the motor vehicle in order to reduce the chance of rear-end collisions when the motor vehicle changes lanes. The rear area to be covered by the radar alarm system on a motor vehicle includes left and right adjacent lanes behind the motor vehicle. Consequently, the radar alarm system needs antennas installed on the rear end of the motor vehicle for monitoring the rear area including obliquely rearward regions.

One conventional pattern of beams radiated from the radar alarm system on a motor vehicle is illustrated in FIG. 4 of the accompanying drawings.

As shown in FIG. 4, the front area in front of the motor vehicle is covered by a plurality of narrow beams F1–F4 which extend over the lane occupied by the motor vehicle itself up to a point that is considerably far ahead from the motor vehicle. Therefore, the radar alarm system is required to have a plurality of front antennas of the same relatively sharp directivity for radiating the plural narrow beams F1–F4. The rear area behind the motor vehicle is covered by a plurality of wider beams B1–B4 which extend widely over left and right adjacent lanes behind the motor vehicle. Accordingly, the radar alarm system is required to have a plurality of rear antennas of the same relatively broad directivity for radiating the plural wider beams B1–B4.

Conventional radar modules for use in radar alarm systems for monitoring the rear area behind a motor vehicle have a plurality of rear antennas of the same directivity for radiating respective beams as shown in FIG. 4. However, the conventional radar modules which use such rear antennas of the same directivity pose certain problems because while the front area to be covered is only the lane occupied by the motor vehicle, the rear area to be covered includes several adjacent lanes behind the motor vehicle. Specifically, an antenna having a wide directivity pattern is suitable to cover a wide region directly obliquely behind the motor vehicle. However, if the same antenna with such a wide directivity pattern is used to cover a region far behind the motor vehicle, then it will require an unduly large amount of electric energy to radiate a beam and may possibly detect a following motor vehicle running behind in the same lane.

Other radar systems for use on motor vehicles are disclosed in Japanese laid-open patent publications Nos. 58-36741, 58-63871, 59-38675, 59-105586, 60-24479, and 60-73382, for example.

SUMMARY OF THE INVENTION

It is therefore an object of the present invention to provide a radar module for a radar system on a motor vehicle, for monitoring a rear area composed of relatively wide near and far regions behind the motor vehicle.

According to the present invention, there is provided a radar module for a radar alarm system on a motor vehicle for detecting a motor vehicle in an adjacent lane behind the motor vehicle, comprising a near-region monitoring antenna for radiating a relatively wide radio-wave beam in a near region positioned behind the motor vehicle and extending over an adjacent lane, and a far-region monitoring antenna for radiating a relatively narrow radio-wave beam in a far region positioned behind the motor vehicle and extending over the adjacent lane.

The near-region monitoring antenna may comprise a first dielectric plate for radiating a first radio wave in response to a first radio-wave signal applied thereto and a first metal block having a first pyramidal horn housing the first dielectric plate for guiding the radiated first radio wave as the relatively wide radio-wave beam, and the far-region monitoring antenna comprises a second dielectric plate for radiating a second radio wave in response to a second radio-wave signal applied thereto, a second metal block having a second pyramidal horn housing the second dielectric plate for guiding the radiated second radio wave, and a convergent reflecting mirror confronting the pyramidal horn for reflecting and converging the guided second radio wave as the relatively narrow radio-wave beam.

According to the present invention, there is also provided a radar module for a radar alarm system on a motor vehicle for detecting a motor vehicle in an adjacent lane behind the motor vehicle, comprising a near-region monitoring antenna for radiating a relatively wide radio-wave beam in a near region positioned behind the motor vehicle and extending over an adjacent lane, and receiving a reflected radio-wave beam, a far-region monitoring antenna for radiating a relatively narrow radio-wave beam in a far region positioned behind the motor vehicle and extending over the adjacent lane, and receiving a reflected radio-wave beam, a radio-wave signal generator for generating a radio-wave signal, a transmission path including an electric energy coupler for supplying the radio-wave signal from the radio-wave signal generator to the near-region monitoring antenna and the far-region monitoring antenna, and mixer means coupled to the transmission path for generating a beat signal by mixing at least one of the reflected radio-wave signal beams with the radio-wave signal generated by the radio-wave signal generator.

The transmission path may comprise a first nonradiative dielectric line extending between the electric energy coupler and the near-region monitoring antenna, and a second nonradiative dielectric line extending between the electric energy coupler and the far-region monitoring antenna, the mixer means comprising a first mixer inserted in the first nonradiative dielectric line and a second mixer inserted in the second nonradiative dielectric line.

Alternatively, the mixer means may comprise a single mixer inserted in the transmission path between the radio-wave signal generator and the electric energy coupler.

According to the present invention, there is further provided an FM radar module for a radar alarm system on a motor vehicle for detecting a motor vehicle in an adjacent lane behind the motor vehicle, comprising a near-region monitoring antenna for radiating a relatively wide FM signal beam in a near region positioned behind the motor vehicle and extending over an adjacent lane, and receiving a reflected FM signal beam, a far-region monitoring antenna for radiating a relatively narrow FM signal beam in a far region positioned behind the motor vehicle and extending over the adjacent lane, and receiving a reflected FM signal beam, an FM signal generator for generating an FM signal, a transmission path including an electric energy coupler for supplying the FM signal from the FM signal generator to the near-region monitoring antenna and the far-region monitoring antenna, and mixer means coupled to the transmission path for generating a beat signal by mixing at least one of the reflected FM signal beams with the FM signal generated by the FM signal generator.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
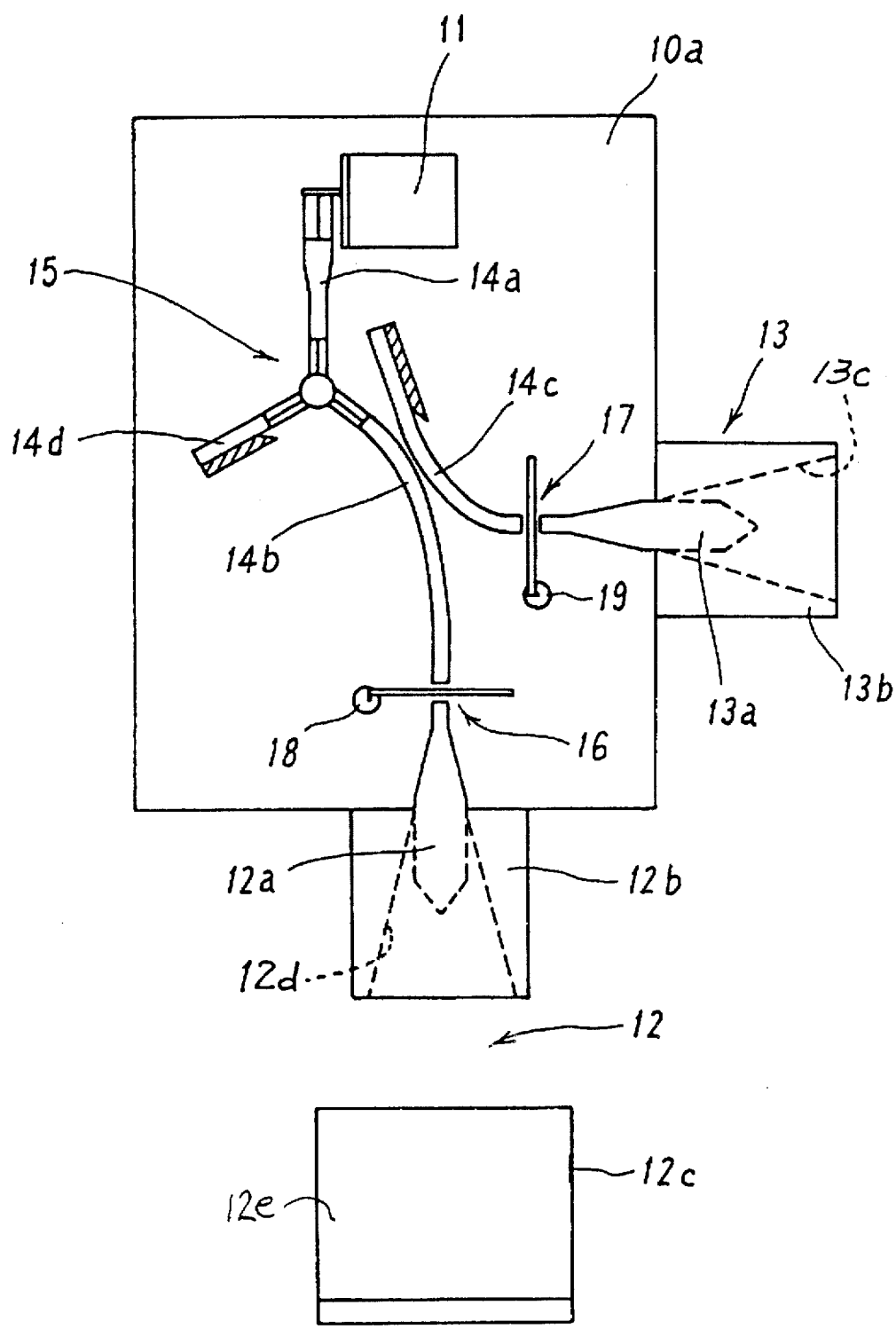
FIG. 1 is a plan view of an FM radar module for use on a motor vehicle according to an embodiment of the present invention.

FIG. 1 shows in plan an FM radar module for use on a motor vehicle according to an embodiment of the present invention. The FM radar module, which is mounted on a rear end of the motor vehicle, is composed primarily of nonradiative dielectric lines including upper and lower conductive plates. However, the upper conductive plate is omitted from illustration in FIG. 1.

As shown in FIG. 1, the FM radar module includes a lower conductive plate 10a, an FM signal generator 11, disposed on the lower conductive plate 10a, a far-region monitoring antenna 12 attached to a rear end of the lower conductive plate 10a, a near-region monitoring antenna 13 attached to a lateral side of the lower conductive plate 10a, a plurality of dielectric rods 14a, 14b, 14c, 14d mounted on the lower conductive plate 10a, an isolator 15 mounted on the lower conductive plate 10a, and a pair of mixers 16, 17 mounted on the lower conductive plate 10a. The dielectric rods 14a, 14b, 14c, 14d, the lower conductive plate 10a, and the upper conductive plate (not shown) jointly make up the nonradiative dielectric lines.

The FM generator 11 comprises a gunn diode and a beam-lead varactor diode, for generating a millimeter-wave FM signal whose frequency varies with time depending on a change in the bias voltage of the varactor diode. An FM signal generated by the FM generator 11 passes through the nonradiative dielectric line composed of the dielectric rod 14a and the upper and lower conductive plates and also through the isolator 15, is propagated through the nonradiative dielectric line composed of the dielectric rod 14b and the upper and lower conductive plates, and is supplied to the far-region monitoring antenna 12 through a transmissive mixer 16 which is inserted in the dielectric rod 14b. The FM signal supplied to the far-region monitoring antenna 12 is then radiated therefrom obliquely rearwardly from the FM radar module toward a rear region far behind the motor vehicle.

An electric energy coupler is present between the nonradiative dielectric line composed of the dielectric rod 14b and the upper and lower conductive plates and the nonradiative dielectric line composed of the dielectric rod 14c and the upper and lower conductive plates. Therefore, part of the FM signal that has passed through the isolator 15 is propagated from the nonradiative dielectric line composed of the dielectric rod 14b through the electric energy coupler to the nonradiative dielectric line composed of the dielectric rod 14c and the upper and lower conductive plates. Then, the FM signal is supplied from the nonradiative dielectric line composed of the dielectric rod 14c to the near-region monitoring antenna 13 through a transmissive mixer 17 which is inserted in the dielectric rod 14c. The FM signal supplied to the near-region monitoring antenna 13 is then radiated therefrom laterally from the FM radar module toward a near region obliquely behind the motor vehicle.

Figure 2:
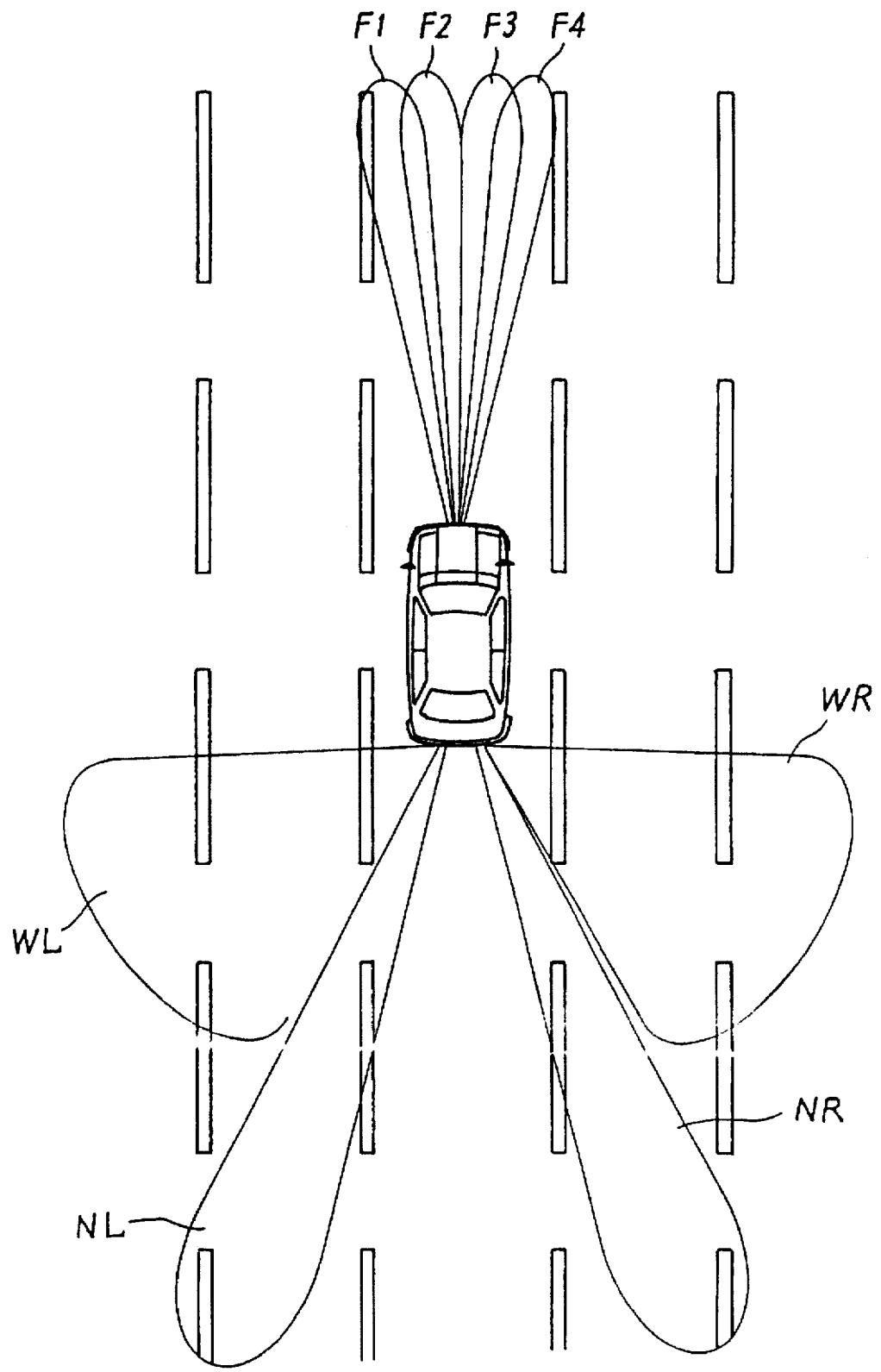
FIG. 2 is a plan view showing a pattern of radio waves radiated from the FM radar module shown in FIG. 1.

The far-region monitoring antenna 12 comprises a dielectric plate 12a projecting rearwardly from a tip end of the nonradiative dielectric line which extends from the dielectric rod 14b and the transmissive mixer 16, outwardly from the upper and lower conductive plates, a metal block 12b attached to the rear end of the lower conductive plate 10a and having a pyramidal horn 12d defined therein which houses the rearwardly projecting dielectric plate 12a, and a convergent reflecting mirror 12c having a parabolic surface 12e which confronts the pyramidal horn 12d in the metal block 12b. The FM signal radiated from the tip end of the dielectric plate 12a travels through the pyramidal horn 12d in the metal block 12b, and reaches the parabolic surface 12e of the reflecting mirror 12c, by which the FM signal is converged and reflected obliquely rearwardly of the motor vehicle in a direction normal to the sheet of FIG. 1 (stated differently, the radar module of FIG. 1 can be thought of as if the sheet containing FIG. 1 is mounted vertically on the rear of the car such that the parabolic surface 12e faces rearwardly from the car to project the beam rearwardly). As shown in FIG. 2, the reflected FM signal is radiated as a narrow beam NR having a relatively sharp directivity pattern into a far rear region over a lane adjacent to the motor vehicle.

The near-region monitoring antenna 13 comprises a dielectric plate 13a projecting laterally from a tip end of the nonradiative dielectric line which extends from the dielectric rod 14c and the transmissive mixer 17, outwardly from the upper and lower conductive plates, and a metal block 13b attached to the lateral side of the lower conductive plate 10a and having a pyramidal horn 13c defined therein which houses the rearwardly projecting dielectric plate 13a. The FM signal radiated from the tip end of the dielectric plate 13a travels through the pyramidal horn 13c in the metal block 13b, and is radiated therefrom obliquely rearwardly of the motor vehicle. Since the near-region monitoring antenna 13 has no convergent reflecting mirror, the FM signal radiated directly from the pyramidal horn 13c is radiated as a wider beam WR (see FIG. 2) having a relatively wide directivity pattern into a near rear region over lanes adjacent to the motor vehicle.

If there is an object such as a following motor vehicle in the adjacent lanes covered by the radiated FM signal beams, then the FM signal beamed from the far- or near-region monitoring antenna 12, 13 is reflected by the object, and applied back to the dielectric plate 12a or 13a. The reflected FM signal is then mixed with the FM signal supplied to the monitoring antenna 12 or 13, by the mixer 16 or 17, producing a low-frequency beat signal. The frequency of the beat signal contains information representing the delay time of the reflected FM signal which is received, i.e., the distance from the motor vehicle up to the object which has reflected the radiated FM signal. The beat signal is transmitted from the mixer 16 or 17 through a coaxial cable 18 or 19 to a control/alarm circuit (not shown).

The motor vehicle supports, on its rear end, a symmetrical FM radar module similar to the FM radar module shown FIG. 1 for radiating FM signal beams NL, WL (see FIG. 2) into far and near regions over other lanes adjacent to the motor vehicle. Furthermore, the motor vehicle supports, on its front end, a plurality of FM radar modules for radiating FM signal beams F1-F4 over the lane occupied by the motor vehicle itself up to a point that is considerably far ahead from the motor vehicle.

The control/alarm circuit controls operation of the FM radar modules, including the FM radar module shown in FIG. 1, for monitoring the front and rear areas of the motor vehicle, and calculates the distance up to motor vehicles running in front of and behind the motor vehicle based on beat signals transmitted from the FM radar modules. The control/alarm circuit supervises a time-dependent change in the calculated distance together with running statuses of the motor vehicles, and issues a warning sound or message if a danger is expected from the various items of information which are being supervised. The control/alarm circuit which performs the above functions is disclosed in U.S. Pat. No. 4,249,823, the disclosure of which is incorporated by reference, and thus will not be described in detail.

For more details of the FM signal generator 11, the antennas 12, 13, the isolator 15, the electric energy coupler, and the transmissive mixers 16, 17, reference should be made to Japanese patent applications Nos. 4-345408, 4-345409, and 345410 which have been published, the disclosures of which are incorporated by reference.

In the above embodiment, the transmissive mixers 16, 17 are positioned adjacent to the respective far- and near-region monitoring antennas 12, 13. This arrangement allows the control/alarm circuit to determine whether the following motor vehicle which reflects the radiated FM signal beam is in the far region or the near region, simply based on which one of the transmissive mixers 16, 17 outputs a beat signal.

Figure 3:
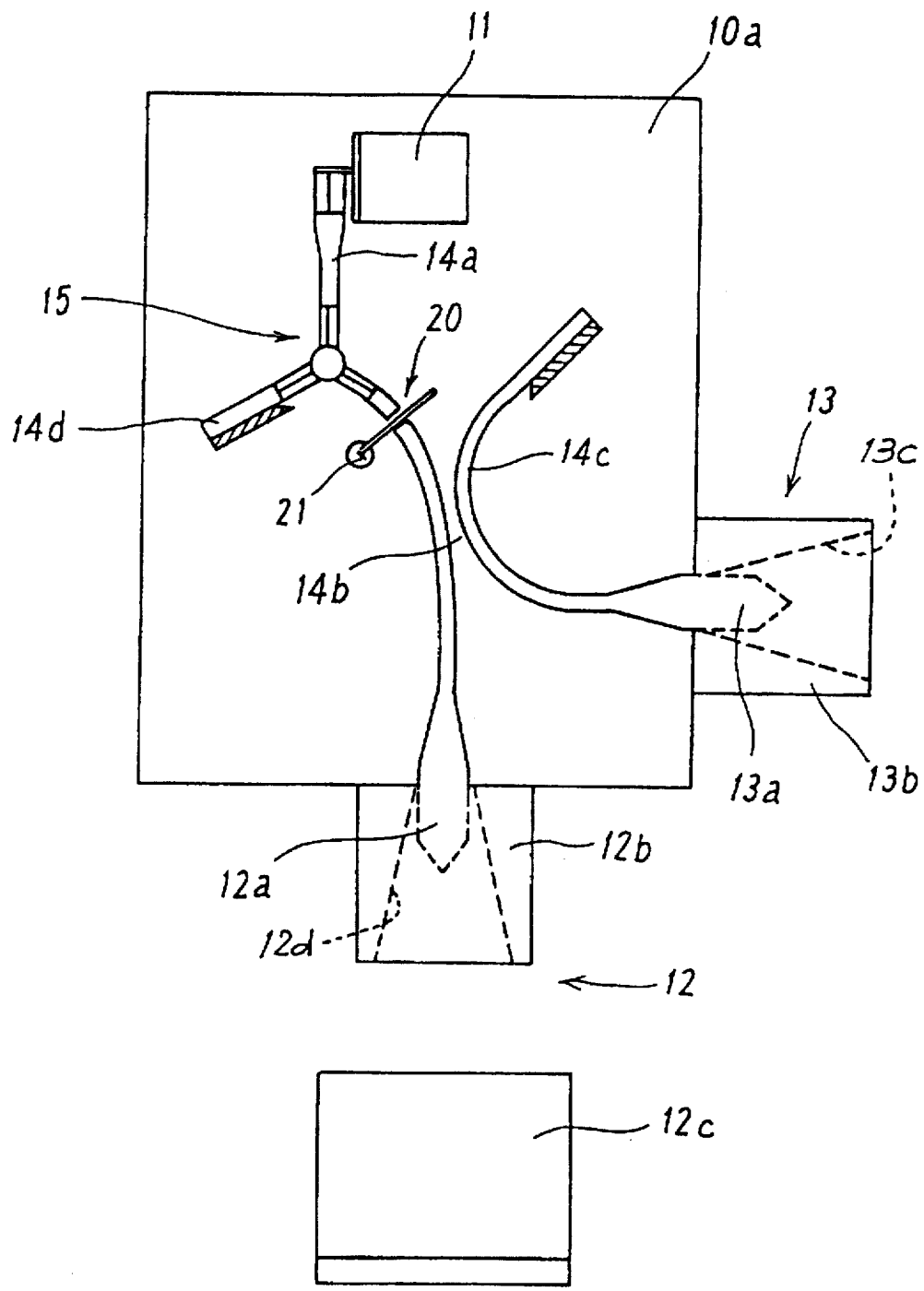
FIG. 3 is a plan view of an FM radar module for use on a motor vehicle according to another embodiment of the present invention.
Figure 4:
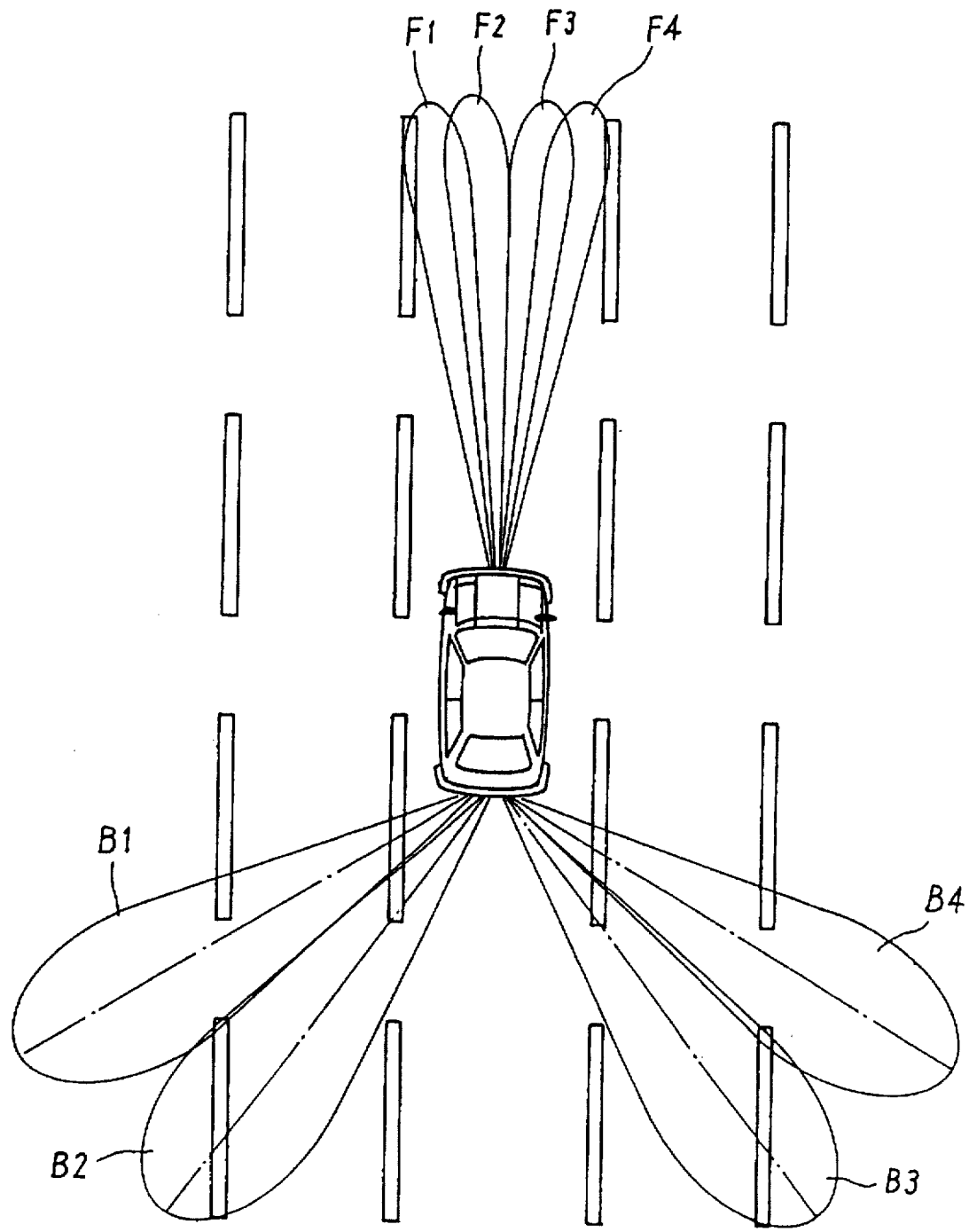
FIG. 4 is a plan view showing a pattern of radio waves radiated from a conventional radar module.

FIG. 3 shows an FM radar module for use on a motor vehicle according to another embodiment of the present invention. The FM radar module shown in FIG. 3 is essentially similar to the FM radar module shown in FIG. 1 except that a single transmissive mixer 20 is inserted in the dielectric rod 14b closely to the isolator 15 for generating and transmitting a beat signal through a coaxial cable 21. According to the embodiment shown in FIG. 3, the control/alarm circuit can monitor both the far- and near-regions behind the motor vehicle with the single transmissive mixer 20.

While the present invention has been described as being embodied in FM radar modules, the principles of the present invention are also applicable to other radar modules including an AM radar module, a pulse radar module, etc.

The FM radar modules shown in FIGS. 1 and 3 are advantageous in that since they have both the far- and near-region monitoring antennas 12, 13 dedicated to cover respective far- and near-regions, they can monitor relatively wide far- and near-regions. Specifically, the FM signal beam WR, WL radiated from the near-region monitoring antenna 13 is scattered over a relatively wide zone to monitor a relatively large near region obliquely behind the motor vehicle, though the FM signal beam WR, WL does not reach a far region. The FM signal beam NR, NL radiated from the far-region monitoring antenna 12 is narrowed into a relatively sharp directivity pattern which reaches a far region well behind the motor vehicle.

Although certain preferred embodiments of the present invention have been shown and described in detail, it should be understood that various changes and modifications may be made therein without departing from the scope of the appended claims.

What is claimed:

1. A radar module for a radar alarm system on a motor vehicle for detecting a motor vehicle in an adjacent lane behind the motor vehicle, comprising:

a near-region monitoring antenna for radiating a relatively wide electromagnetic-wave beam in a near region positioned behind the motor vehicle and extending over an adjacent lane; and a far-region monitoring antenna for radiating a relatively narrow electromagnetic-wave beam in a far region positioned behind the motor vehicle and extending over the adjacent lane.

2. A radar module according to claim 1, wherein said near-region monitoring antenna comprises a first dielectric plate for radiating a first wave in response to a first wave signal applied thereto and a first metal block having a first pyramidal horn housing said first dielectric plate for guiding the radiated first radio wave as the relatively wide wave beam, and said far-region monitoring antenna comprises a second dielectric plate for radiating a second wave in response to a second wave signal applied thereto, a second metal block having a second pyramidal horn housing said second dielectric plate for guiding the radiated second wave, and a convergent reflecting mirror confronting said pyramidal horn for reflecting and converging the guided second wave as said relatively narrow wave beam.

3. A radar module for a radar alarm system on a motor vehicle for detecting a motor vehicle in an adjacent lane behind the motor vehicle, comprising:

a near-region monitoring antenna for radiating a relatively wide radio-wave beam in a near region positioned behind the motor vehicle and extending over an adjacent lane, and receiving a reflected radio-wave beam;

a far-region monitoring antenna for radiating a relatively narrow radio-wave beam in a far region positioned behind the motor vehicle and extending over the adjacent lane, and receiving a reflected radio-wave beam;

a radio-wave signal generator for generating a radio-wave signal;

a transmission path including an electric energy coupler for supplying the radio-wave signal from said radio-wave signal generator to said near-region monitoring antenna and said far-region monitoring antenna; and a mixer coupled to said transmission path for generating a beat signal by mixing at least one of the reflected radio-wave signal beams with the radio-wave signal generated by said radio-wave signal generator.

4. A radar module according to claim 3, wherein said transmission path comprises a first nonradiative dielectric line extending between said electric energy coupler and said near-region monitoring antenna, and a second nonradiative dielectric line extending between said electric energy coupler and said far-region monitoring antenna, said mixer comprising a first mixer inserted in said first nonradiative dielectric line and a second mixer inserted in said second nonradiative dielectric line.

5. A radar module according to claim 3, wherein said mixer comprises a single mixer inserted in said transmission path between said radio-wave signal generator and said electric energy coupler.

6. A radar module according to claim 3, wherein said near-region monitoring antenna comprises a first dielectric plate for radiating a first radio wave in response to a first radio-wave signal applied thereto and a first metal block having a first pyramidal horn housing said first dielectric plate for guiding the radiated first radio wave as the relatively wide radio-wave beam, and said far-region monitoring antenna comprises a second dielectric plate for radiating a second radio wave in response to a second radio-wave signal applied thereto, a second metal block having a second pyramidal horn housing said second dielectric plate for guiding the radiated second radio wave, and a convergent reflecting mirror confronting said pyramidal horn for reflecting and converging the guided second radio wave as said relatively narrow radio-wave beam.

7. An FM radar module for a radar alarm system on a motor vehicle for detecting a motor vehicle in an adjacent lane behind the motor vehicle, comprising:

a near-region monitoring antenna for radiating a relatively wide FM signal beam in a near region positioned behind the motor vehicle and extending over an adjacent lane, and receiving a reflected FM signal beam;

a far-region monitoring antenna for radiating a relatively narrow FM signal beam in a far region positioned behind the motor vehicle and extending over the adjacent lane, and receiving a reflected FM signal beam;

an FM signal generator for generating an FM signal;

a transmission path including an electric energy coupler for supplying the FM signal from said FM signal generator to said near-region monitoring antenna and said far-region monitoring antenna; and a mixer coupled to said transmission path for generating a beat signal by mixing at least one of the reflected FM signal beams with the FM signal generated by said FM signal generator.

8. A radar module according to claim 7, wherein said transmission path comprises a first nonradiative dielectric line extending between said electric energy coupler and said near-region monitoring antenna, and a second nonradiative dielectric line extending between said electric energy coupler and said far-region monitoring antenna, said mixer comprising a first mixer inserted in said first nonradiative dielectric line and a second mixer inserted in said second nonradiative dielectric line.

9. A radar module according to claim 7, wherein said mixer comprises a single mixer inserted in said transmission path between said radio-wave signal generator and said electric energy coupler.

10. A radar module according to claim 7, wherein said near-region monitoring antenna comprises a first dielectric plate for radiating a first FM wave in response to a first FM signal applied thereto and a first metal block having a first pyramidal horn housing said first dielectric plate for guiding the radiated first FM wave as the relatively wide FM beam, and said far-region monitoring antenna comprises a second dielectric plate for radiating a second FM wave in response to a second FM signal applied thereto, a second metal block having a second pyramidal horn housing said second dielectric plate for guiding the radiated second FM wave, and a convergent reflecting mirror confronting said pyramidal horn for reflecting and converging the guided second FM wave as said relatively narrow FM beam.

\* \* \* \* \*